United States Patent
Luneau et al.

(10) Patent No.: US 9,631,557 B2
(45) Date of Patent: Apr. 25, 2017

(54) SEALING DEVICE FOR A TURBOMACHINE TURBINE NOZZLE

(75) Inventors: Florent Pierre Antoine Luneau, Melun (FR); Patrick Joseph Marie Girard, Saint Fargeau Ponthierry (FR); Sebastien Jean Laurent Prestel, Coubert (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 637 days.

(21) Appl. No.: 14/115,014

(22) PCT Filed: May 4, 2012

(86) PCT No.: PCT/FR2012/051003
§ 371 (c)(1),
(2), (4) Date: Oct. 31, 2013

(87) PCT Pub. No.: WO2012/150424
PCT Pub. Date: Nov. 8, 2012

(65) Prior Publication Data
US 2014/0205442 A1    Jul. 24, 2014

(30) Foreign Application Priority Data
May 4, 2011 (FR) ...................................... 11 53837

(51) Int. Cl.
*F01D 11/02* (2006.01)
*F02C 7/28* (2006.01)
(Continued)

(52) U.S. Cl.
CPC .............. *F02C 7/28* (2013.01); *F01D 11/001* (2013.01); *F01D 11/02* (2013.01); *F01D 21/08* (2013.01); *Y02T 50/672* (2013.01)

(58) Field of Classification Search
CPC ....... F01D 11/00; F01D 11/001; F01D 11/002
(Continued)

(56) References Cited

U.S. PATENT DOCUMENTS 1,999,739 A * 4/1935 Rasmussen ............. F01D 11/02
415/170.1
2,314,289 A * 3/1943 Salisbury ................ F01D 5/225
415/173.6
(Continued)

FOREIGN PATENT DOCUMENTS

DE    10 2004 033 924      2/2006
EP         1 895 108        3/2008
(Continued)

OTHER PUBLICATIONS

International Search Report Issued Sep. 4, 2012 in PCT/FR12/051003 Filed May 4, 2012.

*Primary Examiner* — Richard Edgar
(74) *Attorney, Agent, or Firm* — Oblon, McClelland, Maier & Neustadt, L.L.P.

(57) ABSTRACT

A sealing device for a nozzle of a turbomachine turbine including a turbine rotor. The turbine nozzle includes at least one inner annular platform. The turbine rotor includes a downstream spoiler disposed substantially axially. The sealing device includes at least one sealing sheet disposed, radially, between the inner face of the inner platform and the downstream spoiler of the rotor of the turbine so as to form an overlap clearance.

17 Claims, 5 Drawing Sheets

(51) Int. Cl.
*F01D 11/00* (2006.01)
*F01D 21/08* (2006.01)

(58) Field of Classification Search
USPC .......................................... 415/174.5, 173.7
See application file for complete search history.

(56) References Cited

U.S. PATENT DOCUMENTS

| | | | | |
|---|---|---|---|---|
| 3,945,758 | A * | 3/1976 | Lee | F01D 5/187 |
| | | | | 415/115 |
| 5,215,435 | A * | 6/1993 | Webb | F01D 5/08 |
| | | | | 277/414 |
| 7,500,824 | B2 * | 3/2009 | Cheng | F01D 11/02 |
| | | | | 415/173.4 |
| 7,827,685 | B2 * | 11/2010 | McMillan | F01D 11/001 |
| | | | | 277/355 |
| 2003/0146578 | A1 * | 8/2003 | Girard | F01D 25/246 |
| | | | | 277/416 |
| 2007/0160457 | A1 | 7/2007 | Bilson et al. | |
| 2008/0056889 | A1 | 3/2008 | Cheng et al. | |
| 2009/0129916 | A1 * | 5/2009 | Young | F01D 11/001 |
| | | | | 415/115 |
| 2010/0239414 | A1 | 9/2010 | Tesh et al. | |
| 2010/0254806 | A1 | 10/2010 | Deodhar et al. | |

FOREIGN PATENT DOCUMENTS

| | | |
|---|---|---|
| EP | 2 233 699 | 9/2010 |
| EP | 2 239 422 | 10/2010 |

* cited by examiner

SEALING DEVICE FOR A TURBOMACHINE TURBINE NOZZLE

BACKGROUND

The present invention relates to the field of turbomachines such as a turbojet engine or a turboprop engine of an aeroplane, and more particularly to a sealing device for a turbine of such a turbomachine.

Such a turbomachine having a front fan and two spools, for example, comprises, from upstream to downstream, a fan, a low-pressure compressor, a high-pressure compressor, a combustion chamber, a high-pressure turbine and a low-pressure turbine.

By convention, in the present application the terms "upstream" and "downstream" are defined in relation to the flow direction of the air in the turbojet engine. Similarly, by convention, in the present application the terms "inside" and "outside", "lower" and "upper" and "inner" and "outer" are defined radially in relation to the axis of the engine. Thus, a cylinder extending along the axis of the engine comprises an inside face turned towards the axis of the engine and an outside surface, opposed to its inside surface.

A turbomachine low-pressure turbine comprises a turbine shaft on which are mounted a plurality of successive stages, each comprising an impeller and a nozzle. Each impeller comprises a disc carrying at its outer periphery substantially radial blades, the discs of the different impellers being connected coaxially to one another and to the drive shaft of the rotor of the turbine by suitable means. Each nozzle comprises an inner annular platform and an outer annular platform, between which extend substantially radial vanes. The outer platform of the nozzle comprises means for hooking and fixing on an outer casing of the turbine. The assembly of the nozzles forms the stationary portion of the motor known as the stator.

The inner platform comprises a wall extending radially towards the inside of the turbine and an annular ring connected to the wall. The wall and the annular ring thus define an upstream cavity and a downstream cavity between the turbine nozzle and the turbine rotor. The ring, the radial wall and the inner platform of the nozzle are generally formed of a single casting.

In operation, the vanes of the nozzle are exposed to the hot gases flowing in the flow path of the turbine. The temperature of the gases in the flow path is relatively high, typically in the order of 900 degrees Celsius, whereas the temperature in the region between the inner platform of the nozzle and the rotor is lower and for example around 700 degrees Celsius.

In order to consolidate this difference in temperature between the flow path and the cavity, which amounts to limiting the recycling of air, a turbine rotor is known which comprises an upstream spoiler defining a sealing baffle in the upstream cavity defined by the wall and the annular ring so as to form a baffle-type seal.

In order to ensure sealing which makes it possible to avoid heating the discs of the rotor, which would entail a potential risk to the integrity of the machine, and drops in the performance of the turbine such as flow-rate losses or generation of vortices, the downstream spoiler of the turbine rotor and the upstream portion of the inner platform, for each stage, overlap axially in part. Good sealing is thus ensured when the clearance between the downstream spoiler of the turbine rotor and the upstream portion of the inner platform, known as overlap clearance, is less than zero during operation of the turbine.

Another problem arises when the turbine overspeeds. The overspeed problem arises when considering, for example, breakage of the low-pressure turbine shaft during operation. This brings about a large increase in the rotational speed of the turbine, known as overspeed. To stop this malfunction, which can have serious consequences for the integrity of the turbine and thus of the aircraft, it is desirable to break a maximum number of runner blades on the nozzle blades on the basis that the rotor assembly will slip in relation to the stator (comprising the assembly of the nozzles) under the effect of the aerodynamic forces, bringing about contact between the stationary blades of nozzles of the stator and the moving blades of the rotor.

A distinction is made between harmful overspeed clearances, located between the trailing edge of the moving blades of the rotor and the leading edge of the nozzle at the upper level of or in the middle of the flow path, and non-harmful overspeed clearances, located between the trailing edge of the moving blades of the rotor and the leading edge of the nozzle at the lower level of the flow path.

To best control the overspeed and thus maintain the integrity of the turbine, the harmful overspeed clearances must first be bridged, that is to say become zero, before the non-harmful overspeed clearances. This means that the non-harmful overspeed clearances must be increased in order to ensure this hierarchy.

As shown in FIG. 1 and described below with reference to said FIG. 1, the following contradiction is encountered: an increase in the non-harmful lower flow path overspeed clearances involves a reduction in the overlap clearance and vice versa.

BRIEF SUMMARY

The object of the invention is to overcome at least some of these drawbacks and relates to a sealing device for a nozzle of a turbomachine turbine comprising a turbine rotor, said turbine nozzle comprising at least one inner annular platform, said turbine rotor comprising a downstream spoiler disposed substantially axially, said sealing device comprising at least one sealing sheet disposed, radially, between the inner platform and the downstream spoiler of the rotor of the turbine, the device being characterised in that the axial clearance between the sealing sheet and the turbine rotor is less than the axial clearance between the inner platform and the turbine rotor, such that the sealing sheet is crushed by the turbine rotor in the event of contact.

The axial clearance between the sealing sheet and the turbine rotor is thus less than the axial clearance between the inner platform and the turbine rotor, such that the energy used upon the slip of the overspeeding turbine rotor crushes the "fusible" sheet in the event of contact. This makes it possible for the sheet to be impacted before the inner platform in the event of overspeed associated with breakage of the turbine shaft, and to keep the hierarchy between the harmful clearances and the non-harmful clearances between the inner platform and the turbine rotor more open.

Furthermore, the device according to the invention makes it possible to increase the overlap of the downstream spoiler, owing to the sheet, and this improves sealing while avoiding reducing the overspeed clearances, thus making it possible to reduce the axial dimensions (that is to say the length) of the turbine and thus the mass of the turbine. This also makes it possible to limit turbulence and heating of the surrounding parts and thus reductions in performance of the turbine.

The overlap clearance of the downstream spoiler by the sealing sheet is preferably greater than or equal to the overlap clearance of the downstream spoiler by the inner platform. The overlap clearance and the overspeed clearance are thus uncoupled, and this allows them to be optimised. This also ensures a better overlap, which has a direct impact on the performance of the machine and on the service life of the surrounding parts.

The sealing sheet is advantageously configured such that it comprises at least one camber, so as to control the crushing of the sheet in the event of contact with the turbine rotor. This therefore makes it possible for the sealing sheet to be crushed, in a controlled and anticipated manner, by the rotor of the turbine in the event of breakage of the turbine shaft. In addition, this camber facilitates buckling of the sealing sheet.

The sealing sheet is advantageously fixed to the nozzle at at least one point.

According to another feature of the invention, the sealing sheet extends under the lower portion of the downstream spoiler. This makes it possible to create a supplementary baffle in the upstream cavity between the radial wall of the nozzle and the turbine rotor, further limiting turbulence.

According to another feature of the invention, the sealing sheet is fixed by brazing to the radial wall or to the inner platform. This brazing, which is very localised, will thus be broken rapidly in the event of overspeed.

The sealing sheet advantageously comprises an annular element or a plurality of sectorised elements. This makes it possible to ensure the mechanical strength of the device over time, given that said device will be subjected to the same deformations as the inner platform. This also makes it possible to enhance the sealing.

According to a feature of the invention, the annular element further comprises slots distributed over all or some of the circumference of said annular element and perforations at the end of the slots so as to prevent propagation of the slots during operation of the turbine.

Alternatively, the sectorised elements can be connected in pairs by an intersector sheet or by overlap along a sectorisation line.

The device according to the invention may also comprise a cut-off element disposed substantially perpendicular to the downstream spoiler and arranged to reduce the air flow path surface under the lower portion of the downstream spoiler. Turbulence is thus reduced and sealing increased.

The invention also relates to a turbomachine turbine comprising at least one turbine nozzle and at least one turbine rotor, said turbine nozzle comprising at least one inner annular platform, said turbine rotor comprising at least one downstream spoiler disposed substantially axially, said turbine comprising a device as defined above.

BRIEF DESCRIPTION OF THE DRAWINGS

Other features and advantages of the invention will emerge from the following description made with reference to the appended figures which are given by way of non-limiting examples (identical references being given to similar items) and in which.

DETAILED DESCRIPTION

The present invention is described with reference to a turbine of a turbomachine of an aircraft but is applicable to any type of turbine of a gas engine operating in an identical or similar manner.

Figure 1:
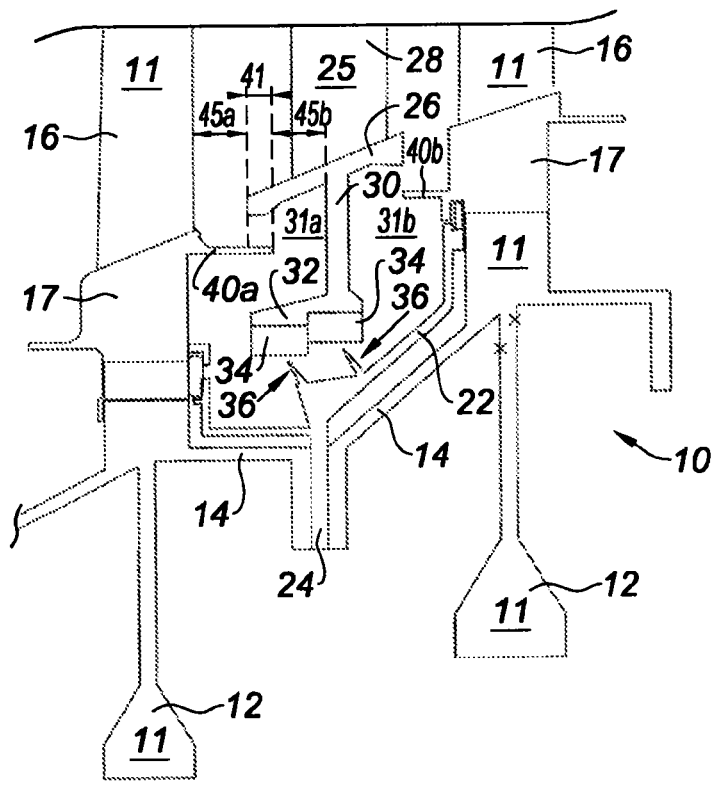
FIG. 1 is an axial sectional view of a first rotor according to the prior art.

Reference is made firstly to FIG. 1, which is a schematic sectional half view of a turbomachine low-pressure turbine 10, in a plane passing through the rotational axis (not shown) of the rotor 11 of the turbine 10. The rotor 11 of the turbine 10 comprises discs 12 joined coaxially to one another by annular flanges 14 and carrying annular rows of moving blades 16 mounted by blade roots, for example in a dovetail manner or the like, at the radially inner ends thereof on the outer periphery of the discs 12. The rotor 11 is connected to a turbine shaft by means of a drive cone (not shown) fixed by means of an annular flange (not shown) between the annular flanges 14 of the discs 12. Annular plates 22 for axial retention of the moving blades 16 on the discs 12 are also mounted between the discs 12 and each comprise a radial wall 24 clamped axially between the annular flanges 14 of two adjacent discs 12. Between the rows of moving blades 16 there are nozzles 25 which each comprise two annular platforms, respectively an inner platform 26 and an outer platform (not shown), interconnected by an annular row of stationary vanes 28. The outer platforms of the nozzles 25 are hooked by suitable means on a casing (not shown) of the low-pressure turbine 10. The inner platforms 26 of the nozzles 25 each comprise a radial wall 30 which extends radially inwards from an inner surface of the platform 26 and which is connected at its inner periphery to a cylindrical support ring 32 of annular elements 34 made of abradable material. The regions defined between the inner wall 26, the radial wall 30 and the annular ring 32 thus form two cavities 31a and 31b.

These abradable elements 34 are arranged radially outside and opposite outer annular wipers 36 carried by the plates 22. The wipers 36 are intended to interact frictionally with the abradable elements 34 so as to form labyrinth seals, the seal plane of which is parallel to the rotational axis 13 of the turbine rotor 11, and thus to limit the passage of air in an axial direction through these seals.

The cylindrical ring 32 comprises, upstream and downstream, annular rims which extend substantially axially from the side opposite the radial wall 30 of the inner platform 26 of the nozzle 25. The ring 32 and the radial wall 30 of each nozzle 25 may be formed in a single casting with the inner platform 26 of this nozzle 25.

Substantially cylindrical upstream 40b and downstream 40a spoilers are formed so as to project axially on the roots 17 of the moving blades 16, extending into the cavities 31a and 31b and thus interacting by baffle effect with these annular rims and with the upstream and downstream edges of the inner platforms 26 to limit the passage of hot gases from the flow path of the turbine 10 radially inwards in the region of the labyrinth seals.

FIG. 1 shows an overlap clearance 41 formed by the overlap of the inner platform 26 of the nozzle 25 over the downstream spoiler 40a of the turbine rotor 11. FIG. 1 also shows the overspeed clearances 45a and 45b respectively between the upstream end of the inner platform 26 of the nozzle 25 and the rotor 11 of the turbine 10 and between the end of the downstream spoiler 40a of the rotor 11 of the turbine 10 and the radial wall 30 of the nozzle 25. This results in the following contradiction: an increase in the non-harmful overspeed clearances 45a and 45b involves a reduction in the overlap clearance 41 and vice versa.

FIGS. 2 to 6 show a plurality of embodiments of the sealing device according to the invention comprising one or more sheet(s) 50a and/or 50b. A sheet is understood to mean a plate of material such as a metal or any material which a person skilled in the art could adapt to use for the purposes of the present invention, for example a composite material, plastics material, etc.

The overlap clearance 43 is thus increased without reducing the overspeed clearances 45a and 45b. The overlap clearance 43 and the overspeed clearances 45a and 45b are thus uncoupled and there remains only one non-contact condition to be established, that is to say parameterising the overspeed clearances 45a and 45b independently of the overlap clearance 43, to ensure that the non-harmful overspeed clearances 45a and 45b will not be bridged before the harmful clearances.

In the event of overspeed, in order to ensure contact of the rotor 11 of the turbine 10 with the sealing sheet 50a and/or 50b before contact with the inner platform 26, it is necessary to ensure that the clearance 46 between the sealing sheet 50a and/or 50b is less than the overspeed clearance 45a. This means that the overlap clearance 43 must be greater than the overlap clearance 41.

The difference between the overlap clearance 43 and the overlap clearance 41 results from the establishment of the clearance 46 which is dimensioned for non-contact (for example, a minimum of approximately 1 mm in operation), instead of the clearance 45a, itself dimensioned for overspeed (for example, approximately 7 mm). The difference in overlap corresponds to the difference between the clearance 45a and the clearance 46.

Figure 2:
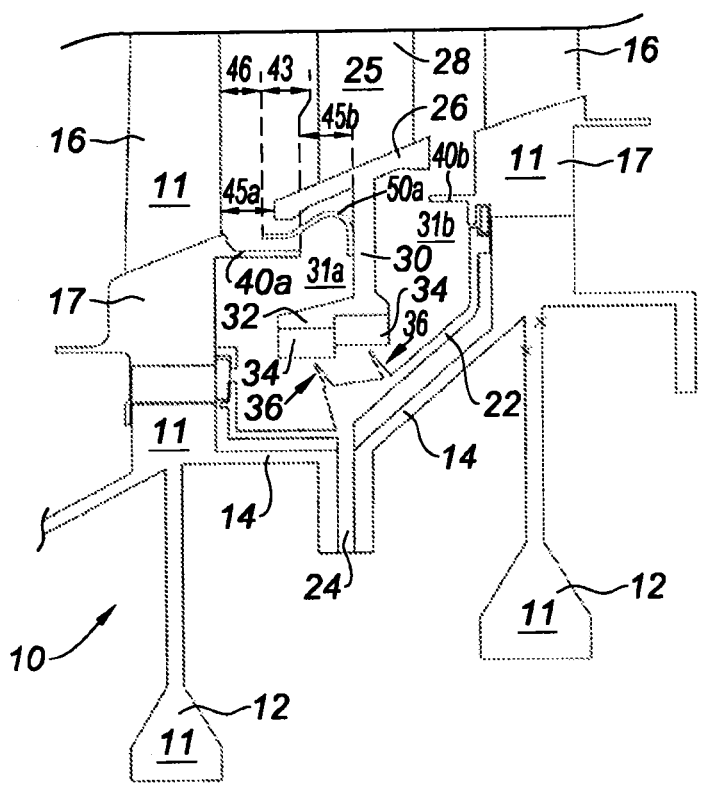
FIG. 2 is an axial sectional view of a rotor comprising a first embodiment of the device according to the invention.

The sealing device according to the invention shown in FIG. 2 comprises a sealing sheet 50a, for example made of metal, mounted on the upstream face of the radial wall 30 of the nozzle 25, extending between the inner platform 26 of the nozzle 25 and the downstream spoiler 40a and arranged to form an overlap clearance 43 with the downstream spoiler 40a (in other words, arranged to overlap the downstream spoiler 40a axially in part). Such an overlap clearance 43 formed by the sealing device according to the invention is equal to or greater than the overlap clearance 41 formed by the inner platform 26 of the nozzle 25 and the downstream spoiler 40a, and this improves sealing while avoiding increasing the overspeed clearances.

In order to prevent the sealing device from representing a non-harmful overspeed clearance, the sealing sheet 50a may for example be a pre-cambered sheet in order that, in the event of breakage of the turbine shaft, said sheet loses some of its axial rigidity so as to be crushed by the moving rotor blades in a desired and anticipated manner, thus serving as a "fusible element".

Furthermore, the addition of such a sheet involves reducing the cavity 31a below the inner platform 26 of the nozzle 25, and this, like the overlap, limits heating of the surrounding parts and reductions in performance.

Figure 3:
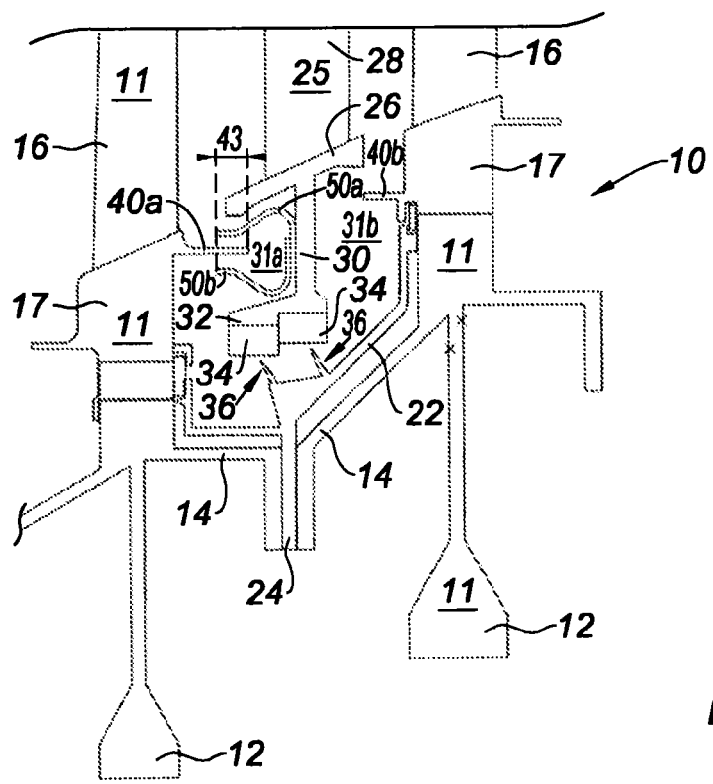
FIG. 3 is an axial sectional view of a rotor comprising a second embodiment of the device according to the invention.
Figure 4:
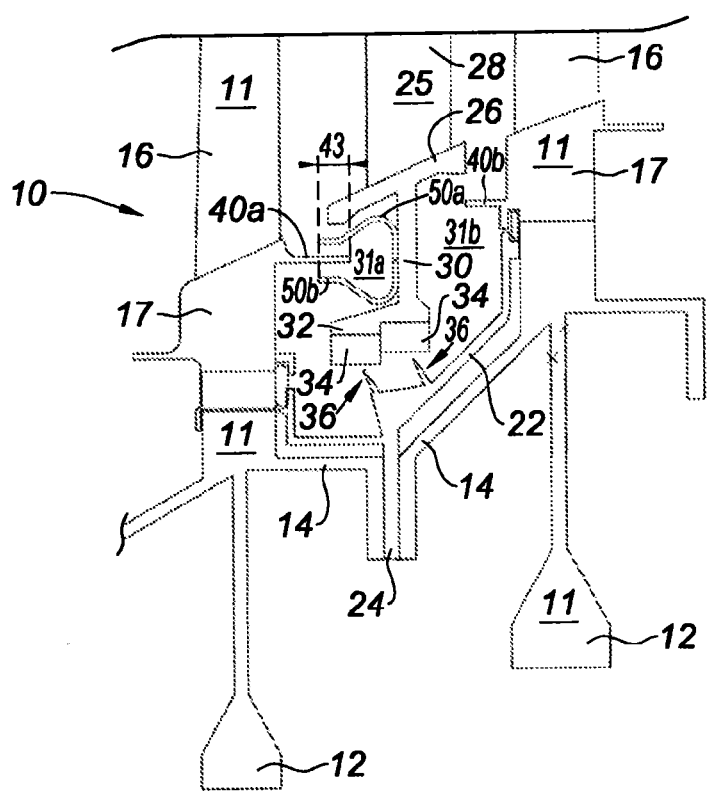
FIG. 4 is an axial sectional view of a rotor comprising a third embodiment of the device according to the invention.

The sealing device may comprise a sealing sheet 50a and a sealing sheet 50b as shown in FIGS. 3 and 4. These two sealing sheets 50a and 50b may for example be mounted in a U-shaped manner in order to provide a better overlap by this addition of a supplementary baffle, and this has the effect of better closing the cavity 31a and thus limiting air turbulence.

It will be noted that the lengths of overlap of the downstream spoiler 40a by the sealing sheets 50a and 50b may be equal or different.

Figure 5:
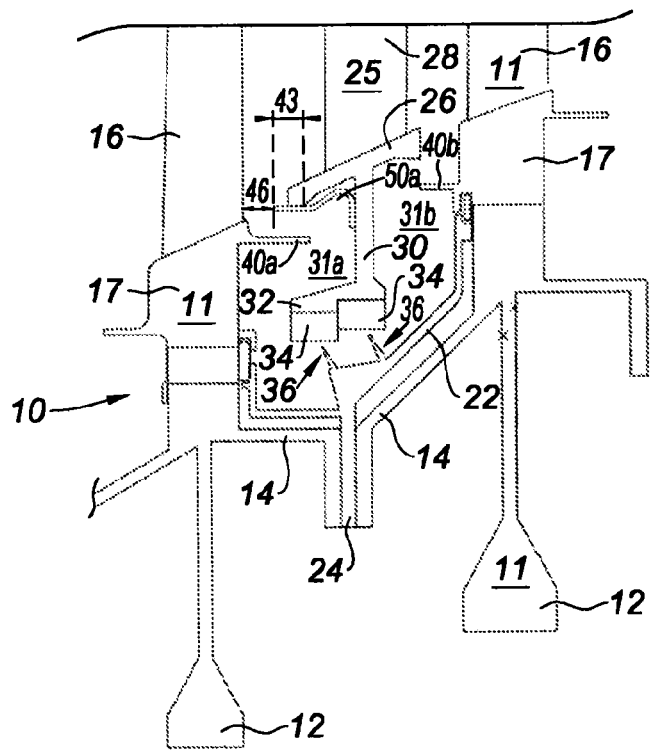
FIG. 5 is an axial sectional view of a rotor comprising a fourth embodiment of the device according to the invention.

In the sealing device shown in FIG. 5, the sheet 50a is fixed, for example by a brazing point, to the inner surface of the inner platform 26 in addition to being fixed to the radial wall 30. These two fixing points have the effect of reducing or even eliminating the vibrations which could be induced by the sealing device according to the invention.

Figure 6A:
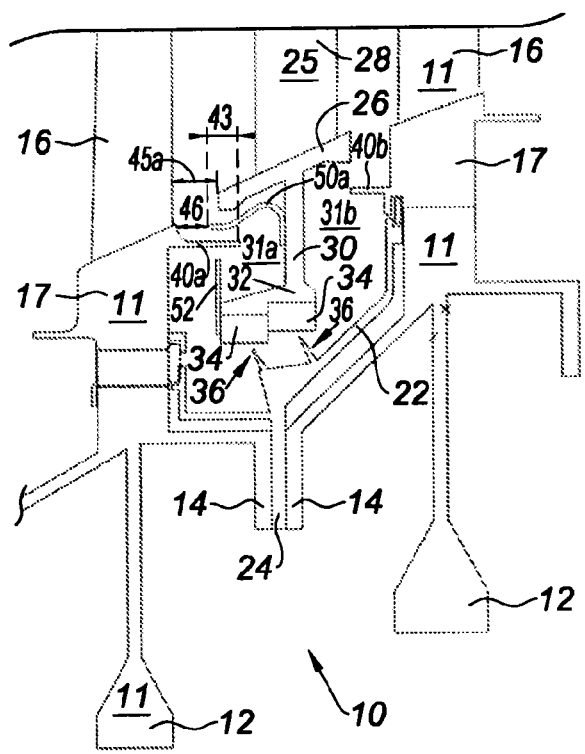
FIG. 6a is an axial sectional view of a rotor comprising a fifth embodiment of the device according to the invention.

In the sealing device shown in FIG. 6a, the sheet 50a is identical to that in FIG. 2 and a cut-off element 52 makes it possible to close further the cavity 31a in order to enhance sealing and thus reduce the air turbulence in the cavity 31a. This improvement makes it possible to reduce heating of the rotor.

In the embodiments of the device according to the invention shown in FIGS. 2 to 6a, the sealing sheets 50a and 50b may be mounted on the radial wall 30 for example by brazing.

Figure 6B:
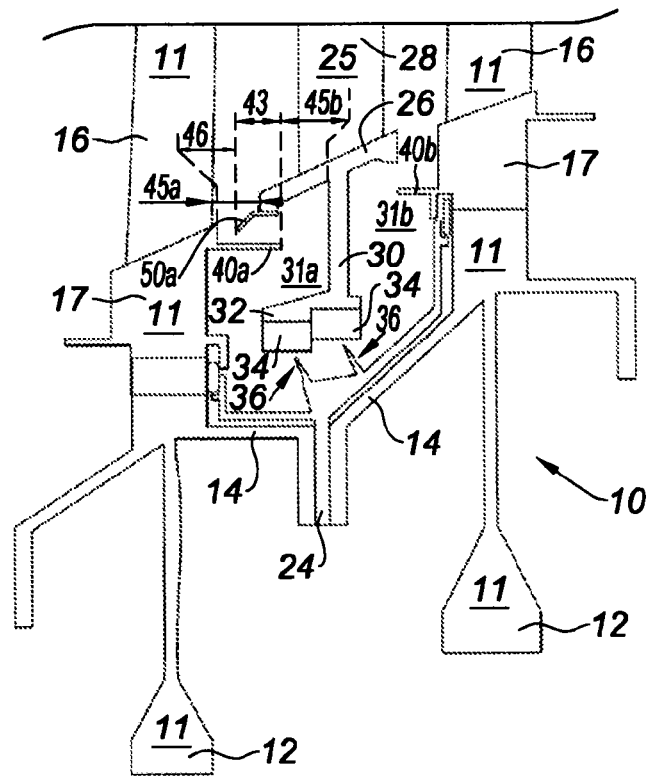
FIG. 6b is an axial sectional view of a rotor comprising a sixth embodiment of the device according to the invention.
Figure 6C:
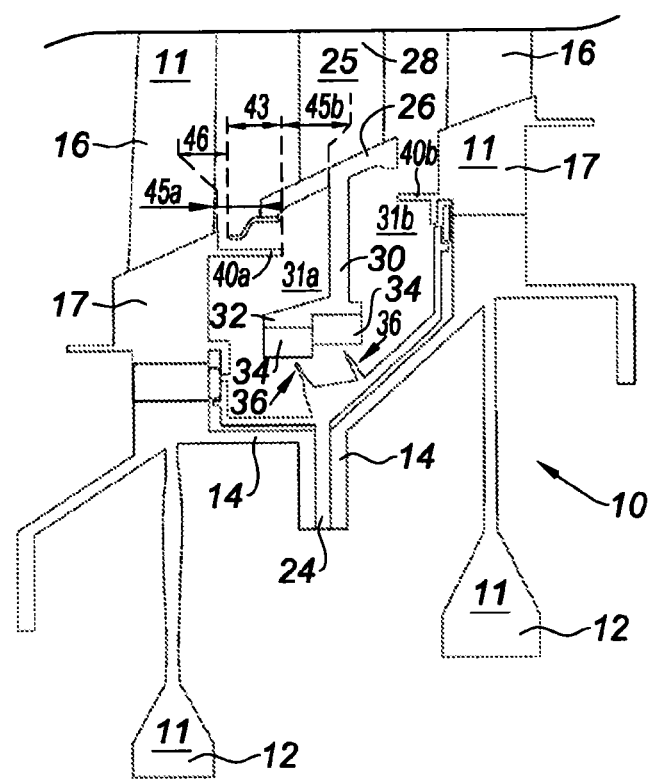
FIG. 6c is an axial sectional view of a rotor comprising a seventh embodiment of the device according to the invention.

FIGS. 6b and 6c each show a device according to the invention mounted on the inner platform 26 of the nozzle 25. These two solutions are well suited to strongly tapering flow paths, as the end of the sheet is thus prevented from going up inside the flow path under the effect of aerodynamic forces. These solutions also make it possible to circumvent possible vibratory problems, as the sheet is made more compact and, for example, by brazing said sheet radially below the lower platform of the nozzle, any radial flapping is eliminated. These solutions thus also make it possible to obtain a minimal radial clearance, and thus a minimal trailing section, without having to modify the radial position of the nozzles 25 and the moving blades 16. Similarly to the other embodiments of the device according to the invention, the sheet may also be pre-buckled to facilitate and control crushing thereof.

It will be noted that the sealing device according to the invention may be mounted on one or more or all of the stages of the turbine.

The sealing device may be fitted over all or part of the circumference of one or more stages of the turbine.

The sealing sheet 50a and/or 50b may be formed of a single annular (360°) element or of a plurality of sectorised elements.

The axial stiffness of one or more sealing sheets 50a and 50b may be downgraded voluntarily in order to fold more easily in the event of contact with the rotor when, for example, the turbine shaft breaks. To this end, one or more sealing sheets 50a and 50b may for example be either sectorised or slit.

Figure 7:
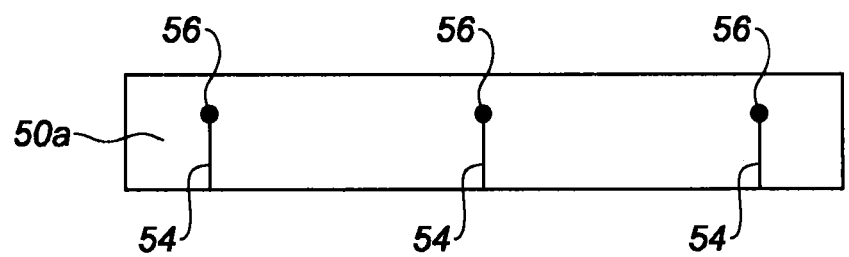
FIG. 7 is a plan view of a device according to the invention comprising slots and holes.

FIG. 7 shows a sealing sheet, for example 50a, a portion of which is slit circumferentially in various places or slots 54. Holes or perforations 56 further reduce the stiffness or rigidity of the sealing sheet 50a. The perforations 56 also prevent propagation of the slots 54 during operation of the turbine. These are also reference points for the machining of the slots 54.

Figure 8:
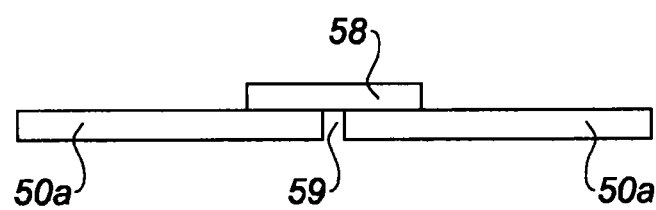
FIG. 8 is a plan view of a device according to the invention, sealing sheets of which are sectorised.

FIG. 8 shows a sealing sheet, for example 50a, comprising sectorised elements, that is to say separated by sectors 59. An overlap element or intersector sheet 58, for example brazed on one or both sheet sectors 50a, makes it possible to enhance sealing by bridging the sector 59.

The sectorisation of the sealing sheets, for example 50a, of the sealing device according to the invention makes it possible in particular to ensure the mechanical strength of the device over time, given that said device will be subjected to the same deformations as the inner platform 26.

Figure 9:
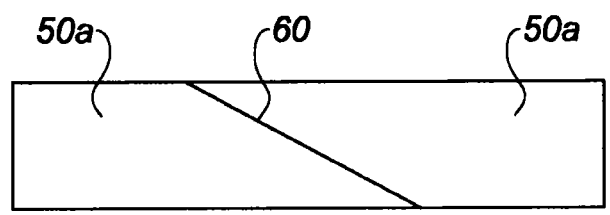
FIG. 9 is a plan view of a device according to the invention, sectorised sealing sheets of which overlap.

In the sectorisation of sealing sheets, for example 50a, shown in FIG. 9, two sheets 50a overlap along a transverse sectorisation line 60, for example, the two sheet sectors 50a may be bevelled 60. In this case, it is the shape of the two sheet sectors 50a which makes it possible to ensure sealing without having to add a supplementary overlap element.

The invention claimed is:

1. A sealing device for a nozzle of a turbomachine turbine comprising a turbine rotor, said turbine nozzle comprising at least one inner annular platform, said turbine rotor comprising a downstream spoiler disposed substantially axially, said sealing device comprising:
    at least one sealing sheet disposed, radially, between the inner platform and the downstream spoiler of the rotor of the turbine,
    wherein the downstream spoiler of the rotor axially overlaps the inner platform,
    wherein the axial clearance between the sealing sheet and the turbine rotor is less than the axial clearance between the inner platform and the turbine rotor, such that the sealing sheet is crushed by the turbine rotor in the event of contact, and
    wherein the sealing sheet extends below a lower portion of the downstream spoiler.

2. The sealing device according to claim 1, wherein the sealing sheet axially overlaps the downstream spoiler of the rotor, said overlap of the downstream spoiler by the sealing sheet being greater than or equal to the overlap of the downstream spoiler by the inner platform.

3. The sealing device according to claim 1, wherein the sealing sheet is a pre-cambered sheet so as to control the crushing of the sealing sheet in the event of contact with the turbine rotor.

4. The sealing device according to claim 1, wherein the sealing sheet is fixed to the nozzle at at least one point.

5. The sealing device according to claim 1, wherein said device further comprises a cut-off element disposed substantially perpendicular to the downstream spoiler and arranged to reduce the air flow path surface under the lower portion of the downstream spoiler.

6. The sealing device according to claim 1, wherein the sealing sheet comprises an annular element.

7. The sealing device according to claim 6, wherein the annular element further comprises slots distributed over the circumference of said annular element and perforations at the end of the slots so as to prevent propagation of the slots during operation of the turbine.

8. The sealing device according to claim 1, wherein the sealing sheet comprises a plurality of sectorised elements.

9. The sealing device according to claim 8, wherein the sectorised elements are connected in pairs by an intersector sheet or by overlap along a sectorisation line.

10. The sealing device according to claim 1, wherein the inner platform includes a radial wall extending inwards and connected to a cylindrical support ring, and the sealing sheet is mounted on an upstream face of the radial wall.

11. The sealing device according to claim 1, wherein the sealing sheet is mounted on an inner surface of the inner platform.

12. The sealing device according to claim 1, wherein a portion of the sealing sheet below the lower portion of the downstream spoiler also axially overlaps the downstream spoiler.

13. A turbomachine turbine, comprising:
    at least one turbine nozzle and at least one turbine rotor, said turbine nozzle comprising at least one inner annular platform, said turbine rotor comprising at least one downstream spoiler disposed substantially axially, said turbine comprising a sealing device that includes at least one sealing sheet disposed, radially, between the inner platform and the downstream spoiler of the rotor of the turbine,
    wherein the downstream spoiler of the rotor axially overlaps the inner platform,
    wherein the axial clearance between the sealing sheet and the turbine rotor is less than the axial clearance between the inner platform and the turbine rotor, such that the sealing sheet is crushed by the turbine rotor in the event of contact, and
    wherein the sealing sheet extends below a lower portion of the downstream spoiler.

14. The turbomachine turbine according to claim 13, wherein the sealing sheet axially overlaps the downstream spoiler of the rotor, said overlap of the downstream spoiler by the sealing sheet being greater than or equal to the overlap of the downstream spoiler by the inner platform.

15. The turbomachine turbine according to claim 13, wherein the inner platform includes a radial wall extending inwards and connected to a cylindrical support ring, and the sealing sheet is mounted on an upstream face of the radial wall.

16. The turbomachine turbine according to claim 13, wherein the sealing sheet is mounted on an inner surface of the inner platform.

17. The turbomachine turbine according to claim 13, wherein a portion of the sealing sheet below the lower portion of the downstream spoiler also axially overlaps the downstream spoiler.

* * * * *